US011186158B2

(12) United States Patent
Yamada et al.

(10) Patent No.: US 11,186,158 B2
(45) Date of Patent: Nov. 30, 2021

(54) BATTERY UNIT MOUNTING STRUCTURE OF ELECTRIC VEHICLE

(71) Applicant: MAZDA MOTOR CORPORATION, Hiroshima (JP)

(72) Inventors: Morihide Yamada, Aki-gun (JP); Kazuhisa Hatano, Aki-gun (JP); Hisashi Akune, Aki-gun (JP); Munenari Takahashi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 70 days.

(21) Appl. No.: 16/832,761

(22) Filed: Mar. 27, 2020

(65) Prior Publication Data

US 2020/0376948 A1 Dec. 3, 2020

(30) Foreign Application Priority Data

May 30, 2019 (JP) .............................. JP2019-101633
Feb. 28, 2020 (JP) .............................. JP2020-033516

(51) Int. Cl.
*B60K 1/04* (2019.01)
*B60L 50/60* (2019.01)
*B62D 25/20* (2006.01)
*H01M 50/20* (2021.01)
*B60K 6/28* (2007.10)

(52) U.S. Cl.
CPC .............. *B60K 1/04* (2013.01); *B60L 50/66* (2019.02); *B62D 25/20* (2013.01); *H01M 50/20* (2021.01); *B60K 6/28* (2013.01); *B60K 2001/0438* (2013.01); *B60Y 2200/91* (2013.01); *B60Y 2200/92* (2013.01); *H01M 2220/20* (2013.01)

(58) Field of Classification Search
CPC combination set(s) only.
See application file for complete search history.

(56) References Cited

U.S. PATENT DOCUMENTS

| 2011/0297467 A1* | 12/2011 | Iwasa ........................ B60K 1/04 180/65.31 |
| 2012/0097466 A1* | 4/2012 | Usami ...................... B60K 1/04 180/68.5 |
| 2012/0321927 A1* | 12/2012 | Loo ........................ H01M 50/20 429/100 |
| 2013/0229030 A1* | 9/2013 | Yamaguchi ............. B60L 50/66 296/193.07 |

(Continued)

FOREIGN PATENT DOCUMENTS

JP H10-129369 A 5/1998
JP 2011-251620 A 12/2011

*Primary Examiner* — Brian L Swenson
(74) *Attorney, Agent, or Firm* — Studebaker & Brackett PC

(57) ABSTRACT

A battery unit comprises side frames, cross frames, and plural battery modules having substantially the same size comprising a longitudinal dimension, a lateral dimension, and a height dimension. The battery modules are respectively mounted at the cross frames in the same position and arranged in plural rows adjacently to a vehicle width direction such that a direction of the above-described longitudinal dimension is substantially parallel to a vehicle longitudinal direction, and mounting rigidity of the battery modules stored in a first storage area is set to be different from that of the battery modules stored in second and third storage areas.

20 Claims, 11 Drawing Sheets

(56) References Cited

U.S. PATENT DOCUMENTS

| | | | |
|---|---|---|---|
| 2015/0349389 A1* | 12/2015 | Kobune | B60L 58/27 |
| | | | 429/90 |
| 2016/0375750 A1* | 12/2016 | Hokazono | B62D 25/2036 |
| | | | 180/68.5 |
| 2017/0001507 A1* | 1/2017 | Ashraf | B62D 25/2036 |
| 2018/0126857 A1* | 5/2018 | Kelly-Morgan | B60L 50/51 |
| 2018/0215282 A1* | 8/2018 | Pohl | H01M 10/613 |

* cited by examiner

BATTERY UNIT MOUNTING STRUCTURE OF ELECTRIC VEHICLE

BACKGROUND OF THE INVENTION

The present invention relates to a battery unit mounting structure of an electric vehicle comprising a battery unit supporting a battery module and mounted at a pair of floor frames.

Conventionally, the battery unit is arranged in a space below a vehicle-body floor in the electric vehicle, such as a hybrid vehicle or an electric automotive vehicle, because a battery as a driving source of an electric motor (e.g., a motor generator or a motor) for driving wheels has a large capacity. The battery unit generally comprises plural battery modules of combined battery cells, such as lithium ion, a battery case which stores the plural battery modules, frames of the battery case, and others.

A battery mounting structure of an electric vehicle disclosed in Japanese Patent Laid-Open Publication No. 2011-251620 comprises a floor panel, a pair of right-and-left floor frames provided below the floor panel, each of which forms a closed-cross section extending longitudinally cooperatively with the floor panel, and a battery unit supporting battery modules and mounted at the pair of floor frames, wherein the battery unit comprises a lower-side cover member mounting the battery modules, an upper-side cover member covering over the lower-side cover member, and frames forming respective skeletons of the lower-side cover member and the upper-side cover member, and part of the plural battery modules are arranged in a front-side area of the frames in such a manner that their longitudinal direction extends in a vehicle width direction and the other part of the plural battery modules are arranged in a rear-side area of the frames in such a manner that their longitudinal direction extends in a vehicle longitudinal direction.

Vibration energy caused by a wheel running on a road surface is transmitted to a vehicle-body strength member through a suspension member and then vibrates a panel member, such as a floor panel forming a cabin, in a vehicle steady traveling. Traveling noises, such as drumming noise or road noise, are generated by the above-described vibration of the panel member. The drumming noise is a low-frequency sound of 20-50 Hz, and the road noise is a middle-frequency sound of 100-400 Hz. The drumming noise is sometimes called the road noise. These traveling noises, including the drumming noise and the road noise, may be suppressed by adding a damping material or increasing rigidity of a lower vehicle-body (see Japanese Patent Laid-Open Publication No. H10-129369, for example).

In the battery mounting structure of the electric vehicle disclosed in the above-described first patent document, since the plural battery modules are arranged such that a longitudinal direction of the battery modules provided at a front-side first mounting portion corresponds to (matches) the vehicle width direction and a longitudinal direction of the battery modules provided at a rear-side second mounting portion corresponds to (matches) the vehicle longitudinal direction, a size of the battery unit becomes so large that a large space for arranging the battery unit may be required. Herein, it may be possible to minimize its arrangement space by mounting the plural battery modules at the vehicle body, particularly below the floor panel, such that the battery modules are arranged in plural rows and in the same position in three directions of the vehicle width direction, the vehicle longitudinal direction, and the height direction.

However, in a case where the plural battery modules are arranged in the same position and in the plural rows as described above, there is a concern that since each of the battery modules has substantially the same natural frequency, all of these battery modules so resonate with vehicle-body vibration at a specified frequency band that the vehicle-body vibration may be improperly amplified. In a case where they resonate with the vehicle-body vibration at a middle-frequency band of 100-400 Hz, there is a concern that the road-noise performance may be deteriorated. That is, it may not be easy to reduce the traveling noises, securing compactness of the battery unit.

SUMMARY OF THE INVENTION

Accordingly, an object of the present invention is to provide a battery unit mounting structure of an electric vehicle which can reduce the traveling noises properly, securing the compactness of the battery unit.

The present invention is a battery unit mounting structure of an electric vehicle, comprising a floor panel, a pair of right-and-left floor frames provided below the floor panel, each of which forms a closed-cross section extending longitudinally cooperatively with the floor panel, and a battery unit supporting plural battery modules and mounted at the pair of floor frames, wherein the battery unit comprises a pair of right-and-left side frames attached to the pair of floor frames, a cross frame extending in a vehicle width direction and interconnecting the pair of side frames, and the plural battery modules, the plural battery modules are respectively formed in a rectangular shape in a plan view and have substantially the same size comprising a longitudinal dimension which corresponds to a longitudinal direction of the rectangular shape, a lateral dimension which corresponds to a direction perpendicular to the longitudinal direction of the rectangular shape, and a height dimension which corresponds to a vehicle vertical direction perpendicular to the longitudinal direction and the direction perpendicular to the longitudinal direction of the rectangular shape, the plural battery modules are respectively mounted at the side frames and/or the cross frame in the same position and arranged in plural rows adjacently to the vehicle width direction and/or a vehicle longitudinal direction such that the direction of the longitudinal dimension of the rectangular shape is substantially parallel to the vehicle longitudinal direction or the vehicle width direction, and mounting rigidity of the battery modules positioned at a part of the plural rows is set to be different from that of the battery modules positioned at another part of the plural rows.

According to the battery unit mounting structure of the electric vehicle of the present invention, the battery unit comprises the pair of right-and-left side frames attached to the pair of floor frames, the cross frame extending in the vehicle width direction and interconnecting the pair of side frames, and the plural battery modules which are respectively formed in the rectangular shape in the plan view and have substantially the same size comprising the longitudinal dimension which corresponds to the longitudinal direction of the rectangular shape, the lateral dimension which corresponds to the direction perpendicular to the longitudinal direction of the rectangular shape, and the height dimension which corresponds to the vehicle vertical direction perpendicular to the longitudinal direction and the direction perpendicular to the longitudinal direction of the rectangular shape, and the plural battery modules are respectively mounted at the side frames and/or the cross frame in the same position and arranged in the plural rows adjacently to the vehicle width direction and/or the vehicle longitudinal direction such that the direction of the longitudinal dimension of the rectangular shape is substantially parallel to the vehicle longitudinal direction or the vehicle width direction. Therefore, the battery unit can be compact properly. Further, since the mounting rigidity of the battery modules positioned at a part of the plural rows is set to be different from that of the battery modules positioned at another part of the plural rows, the natural frequency of the battery modules positioned at the part of the plural rows and the natural frequency of the battery modules positioned at the other part of the plural rows can be differentiated by changing the mounting rigidity of these battery modules, so that an element of the middle-frequency band of the battery unit is so reduced that resonance of the battery unit and the vehicle-body vibration can be suppressed properly.

In an embodiment of the present invention, the plural battery modules are arranged in three or more rows extending in the vehicle width direction, and the mounting rigidity of the battery modules positioned at any one-end-side row of the three or more rows is set to be different from that of the battery modules positioned at the other row of the three or more rows.

According to this embodiment, the resonance-suppression performance can be improved by changing the mounting rigidity of the battery modules positioned at the one-end-side row which may greatly affect the vehicle-body vibration.

In another embodiment of the present invention, the plural battery modules are arranged in the longitudinal direction in three or more rows, the battery modules positioned at a foremost row of the three or more rows are arranged in a single-layer state and the battery modules positioned at a rearmost row of the three or more rows are arranged below a kick-up portion of the floor panel in a two-layer state of upper-and-lower two stages, and the mounting rigidity of the battery modules positioned at the foremost row is set to be different from that of the battery modules positioned at the other row.

According to this embodiment, the road-noise performance of the battery unit where the battery modules are mounted in the upper-and-lower two stages can be improved by minimum mounting-rigidity changing.

In another embodiment of the present invention, the plural battery modules are arranged in the longitudinal direction in three or more rows, the battery modules positioned at a foremost row and a second row behind the foremost row of the three or more rows are arranged in a single-layer state and the battery modules positioned at another row behind the second row are arranged in the two-layer state of the upper-and-lower two stages, and the mounting rigidity of the battery modules positioned at the foremost row is set to be different from that of the battery modules positioned at the second row.

According to this embodiment, the road-noise performance of the battery unit where the battery modules are mounted in the upper-and-lower two stages can be improved by minimum mounting-rigidity changing.

In another embodiment of the present invention, the plural battery modules are mounted at the side frames and/or the cross frame by mounting brackets.

According to this embodiment, the mounting rigidity of the battery modules can be changed by changing of the mounting brackets regardless of characteristics of the side frames and/or the cross frame.

In another embodiment of the present invention, the mounting rigidity of the battery modules positioned at the part of the plural rows is set to be higher than the mounting rigidity of the battery modules positioned at the other part of the plural rows.

According to this embodiment, the natural frequency of the battery modules positioned at the part of the plural rows and the natural frequency of the battery modules positioned at the other part of the plural rows can be differentiated, securing the mounting rigidity of the battery modules positioned at the part of the plural rows.

In another embodiment of the present invention, the number of mounting points of the mounting brackets to mount the battery modules positioned at the part of the plural rows is set to be larger than the number of mounting points of the mounting brackets to mount the battery modules positioned at the other part of the plural rows.

According to this embodiment, the natural frequency of the battery modules positioned at the part of the plural rows can be higher than the natural frequency of the battery modules positioned at the other part of the plural rows by minimum changing.

The present invention will become apparent from the following description which refers to the accompanying drawings.

DETAILED DESCRIPTION OF THE INVENTION

Figure 1:
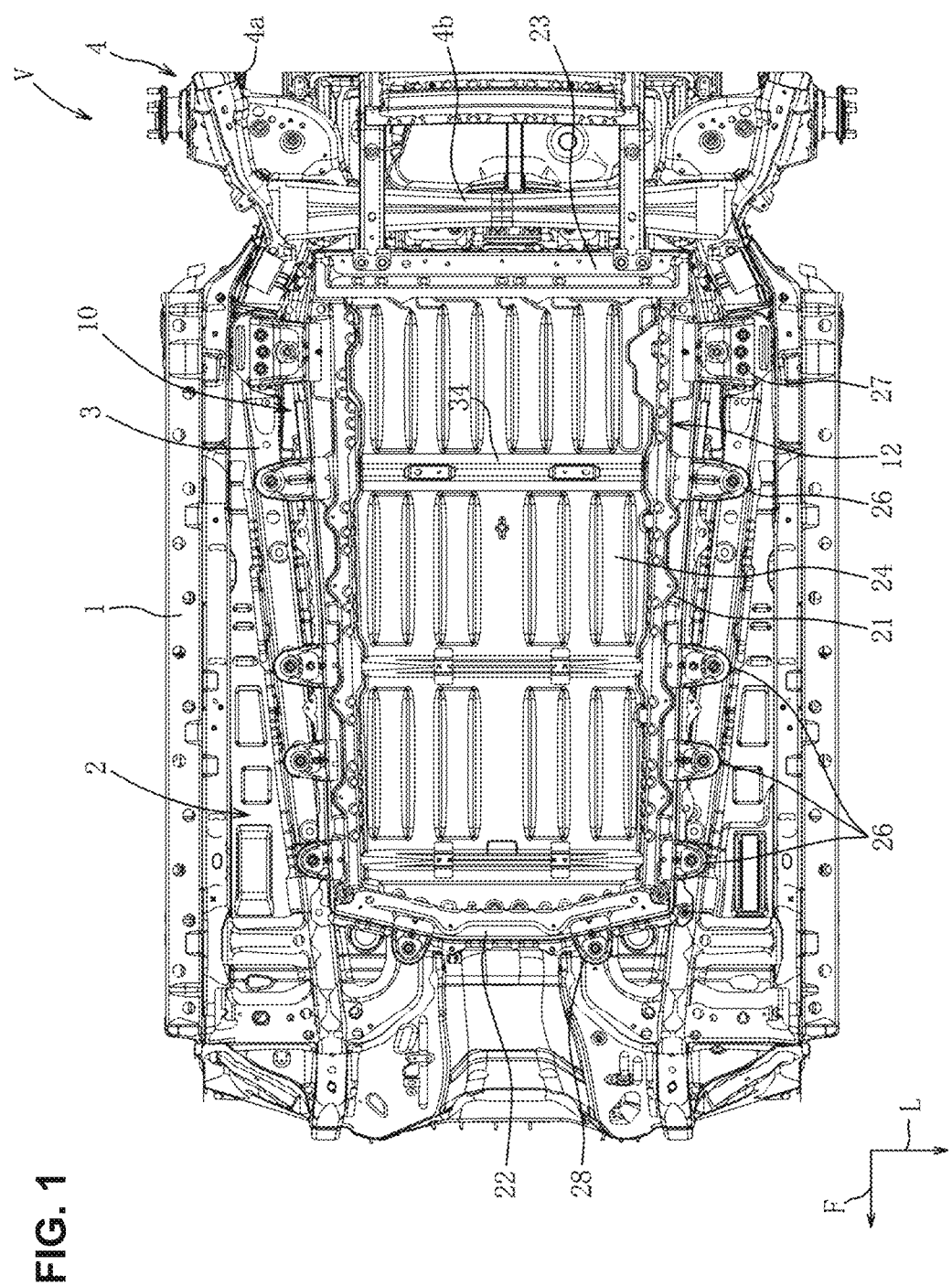
FIG. 1 is a bottom view of an electric vehicle according to an embodiment.

Hereafter, an embodiment of the present embodiment will be described referring to the drawings. The flowing description of the embodiment merely exemplify the present invention substantially, and therefore the present invention and its applications or uses should not be limited by the following description.

The embodiment of the present invention will be described referring to FIGS. 1-11. A vehicle V according to the present embodiment is a hybrid automotive vehicle provided with a driving source which combines an internal combustion engine (not illustrated), such as a gasoline or diesel engine and an electric motor (motor generator) for vehicle driving.

Figure 2:
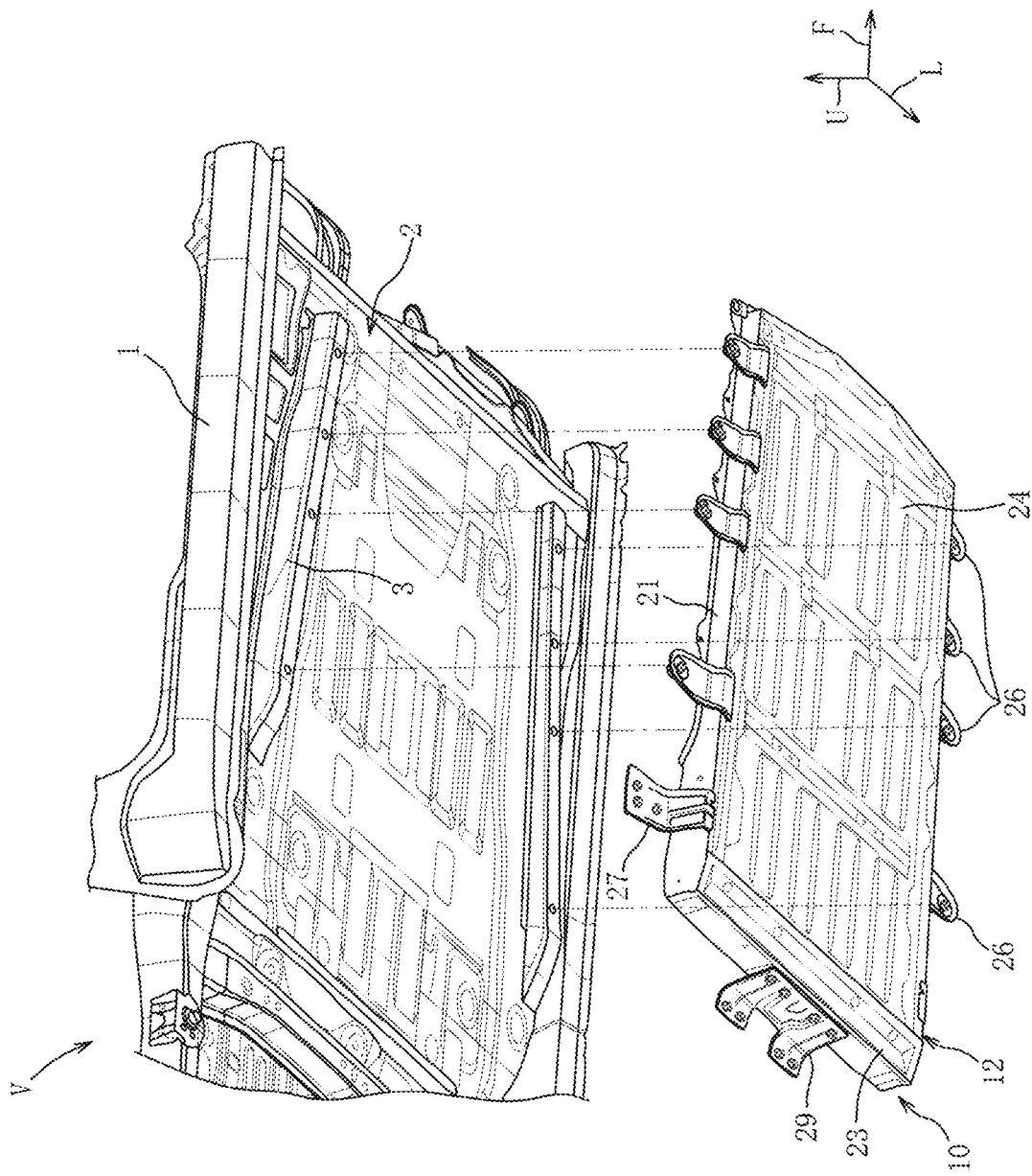
FIG. 2 is a perspective view of the electric vehicle, when viewed from a lower-rear side.

As shown in FIGS. 1 and 2, the vehicle V comprises a pair of right-and-left side sills 1 extending longitudinally, a floor panel 2, a pair of right-and-left floor frames 3 extending longitudinally, a battery unit 10, and others. In the figures, an arrow F shows a forward (front) side in a vehicle longitudinal direction, an arrow L shows a leftward (left) side in a vehicle width direction, and an arrow U shows an upward (upper) side in a vehicle vertical direction. The vehicle V is configured to be substantially symmetrical laterally.

A whole structure of the vehicle V will be described first. The side sill 1 comprises an outer panel which is configured to have a nearly hat-shaped cross section and forms an outside wall portion in the vehicle width direction and an inner panel which is configured to have a nearly hat-shaped cross section and forms an inside wall portion in the vehicle width direction, and these panels jointly form a nearly rectangular-shaped closed-cross section extending longitudinally. A hinge pillar extending vertically is connected to a front-end portion of the side sill 1, and a rear pillar extending vertically is connected to a rear-end portion of the side sill 1. Herein, the vehicle V has a door structure of a so-called double-hinged door type in which a front door is hinged to the hinge pillar at its front end portion and a rear door is hinged to the rear pillar at its rear end portion. Herein, a center pillar is not provided.

Figure 8:
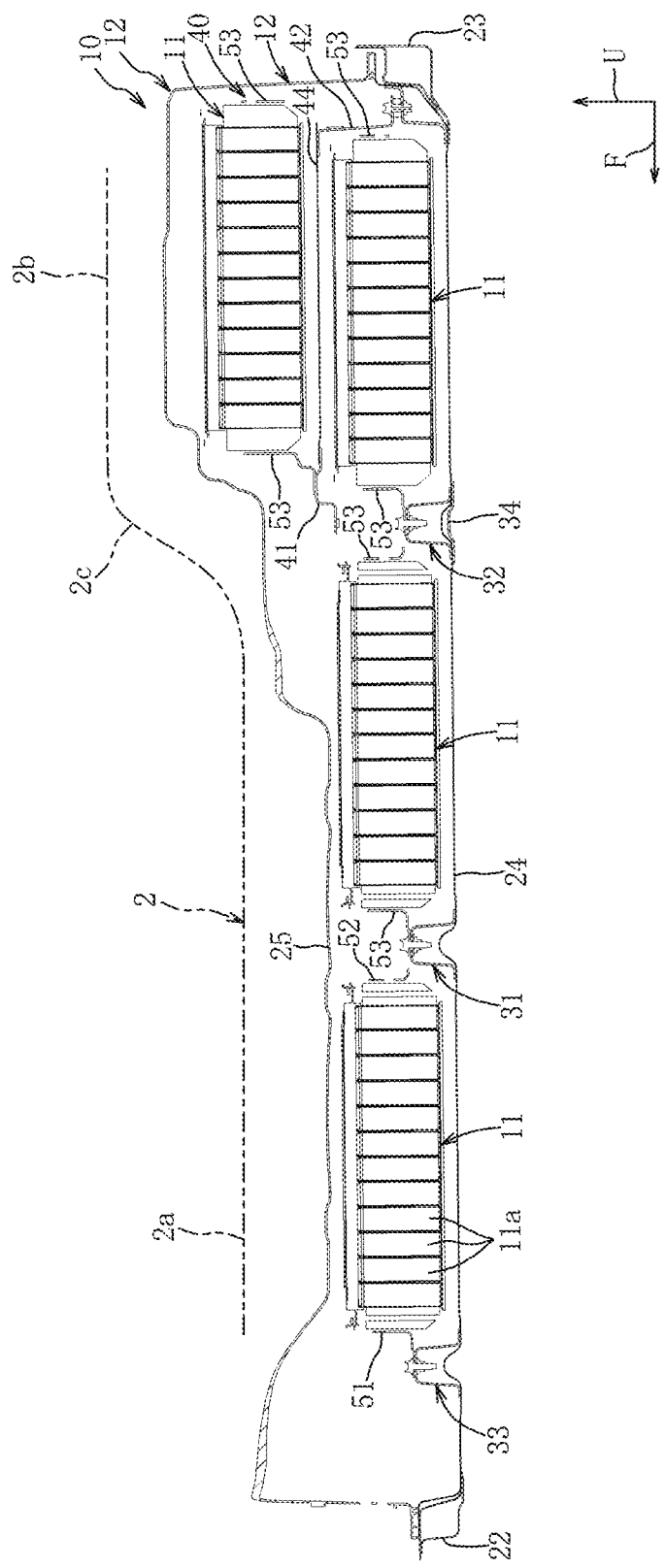
FIG. 8 is a sectional view taken along line VIII-VIII of FIG. 4.

The floor panel 2 is fully flat such that it extends between the pair of side sills 1 and there is not provided a tunnel portion protruding toward an inside of a cabin. As shown in FIGS. 1, 2 and 8, the floor panel 2 comprises a front panel 2a where a seat for a front-seat passenger (not illustrated) is placed and a rear panel 2b where a seat for a rear-seat passenger (not illustrated) is placed.

Each of the pair of floor frames 3 is configured to have a nearly hat-shaped cross section, and a distance between the pair of floor frames 3 increases as it goes rearwardly. Therefore, a distance between the side sill 1 and the floor frame 3 adjacent to this side sill 1 becomes closer as it goes rearwardly. The floor frame 3 forms a nearly rectangular-shaped closed-cross section extending longitudinally cooperatively with a lower surface of the front panel 2a. A rear suspension 4 is arranged in back of the kick-up panel 2c and below the rear panel 2b. The rear suspension 4 is a torsion beam type of suspension which comprises a pair of right-and-left trailing arms 4a which rotatably support wheels (not illustrated) at their rear end portions and a torsion beam 4b which extends laterally and interconnects the pair of trailing arms 4a at both ends, in the vehicle width direction, thereof.

Figure 3:
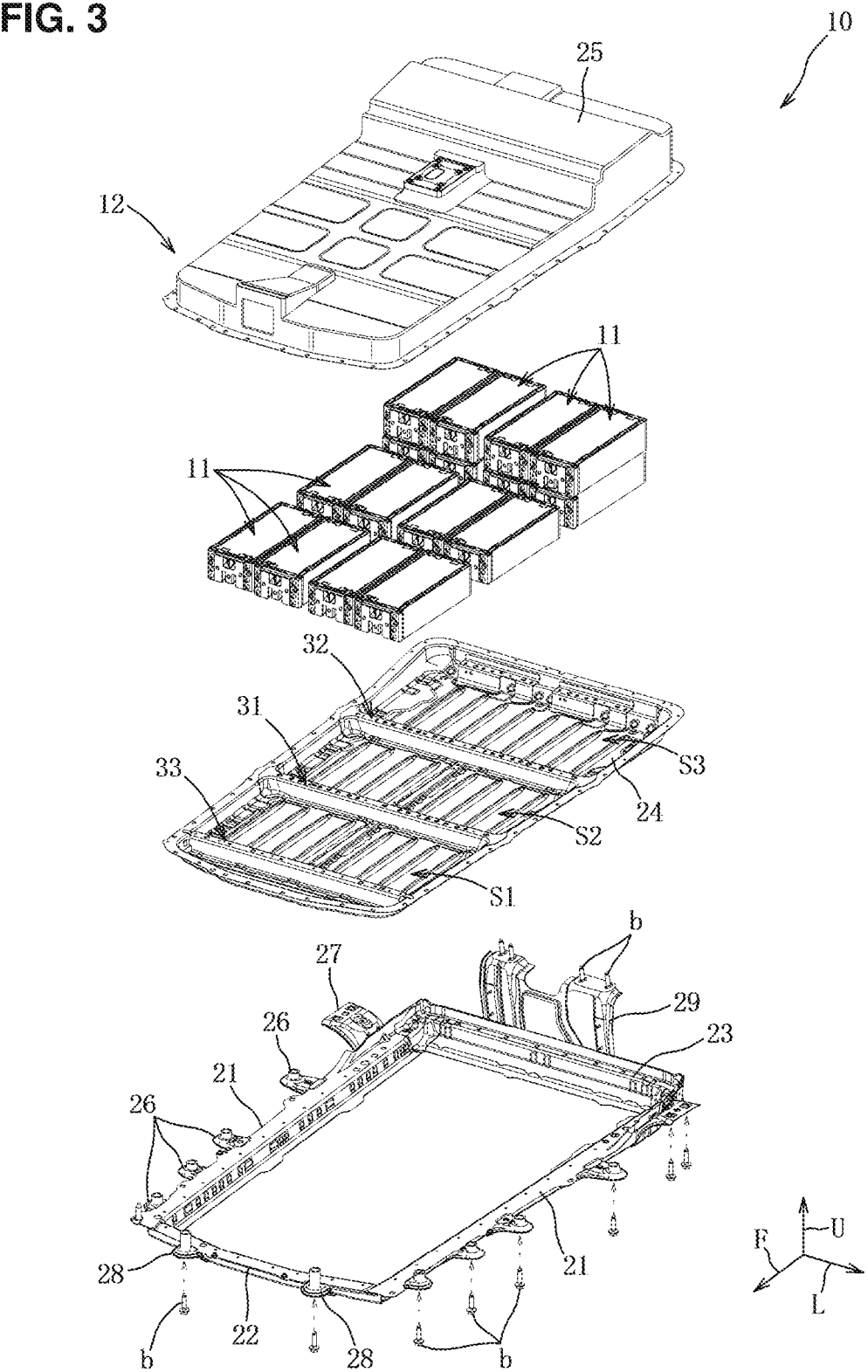
FIG. 3 is an exploded perspective view of a battery unit.

Next, the battery unit 10 will be described. As shown in FIGS. 1 and 2, the battery unit 10 is arranged in a space below the floor panel 2. As shown in FIG. 3, the battery unit 10 comprises plural (e.g., sixteen) battery modules 11 and a battery case 12 which stores the battery modules 11. The battery module 11 which supplies a power to an electric motor for vehicle driving is configured as a rectangular-parallelepiped shaped battery assembly in which plural rectangular-parallelepiped shaped battery cells 11a (see FIG. 8) having specification voltage are arranged longitudinally in a layer shape. This battery module 11 is formed in the rectangular shape in a plan view. The battery cell 11a is a lithium ion battery, a kind of a secondary battery, for example.

The plural battery modules 11 are configured to have substantially the same size comprising a longitudinal dimension which corresponds to a longitudinal direction of the rectangular shape, a lateral dimension which corresponds to a direction perpendicular to the longitudinal direction of the rectangular shape, and a height dimension which corresponds to a vehicle vertical direction perpendicular to the longitudinal direction and the direction perpendicular to the longitudinal direction of the rectangular shape, wherein the plural battery modules 11 are stored in the battery case 12 in such a manner that each longitudinal direction is parallel to the vehicle longitudinal direction. The weight of the battery module 11 is about 14 kg and the total weight of the battery unit 10 is about 300 kg, for example.

The battery case 12 is configured to secure the vibration resistance as well as the water resistance for a high-voltage battery where the battery modules 11 are connected in series. As shown in FIG. 3, the battery case 12 comprises a pair of right-and-left side frames 21, a front frame 22 which extends laterally and interconnects respective front end portions of the pair of side frames 21, a rear frame 23 which extends laterally and interconnects respective rear end portions of the pair of side frames 21, a tub-shaped battery tray 24 which is supported at the frames 21-23 and forms a bottom portion of the battery case 12, a synthetic-resin made cover member 25 which forms a sealed space for storing the plural battery modules 11 cooperatively with the battery tray 24, and so on.

Figure 7:
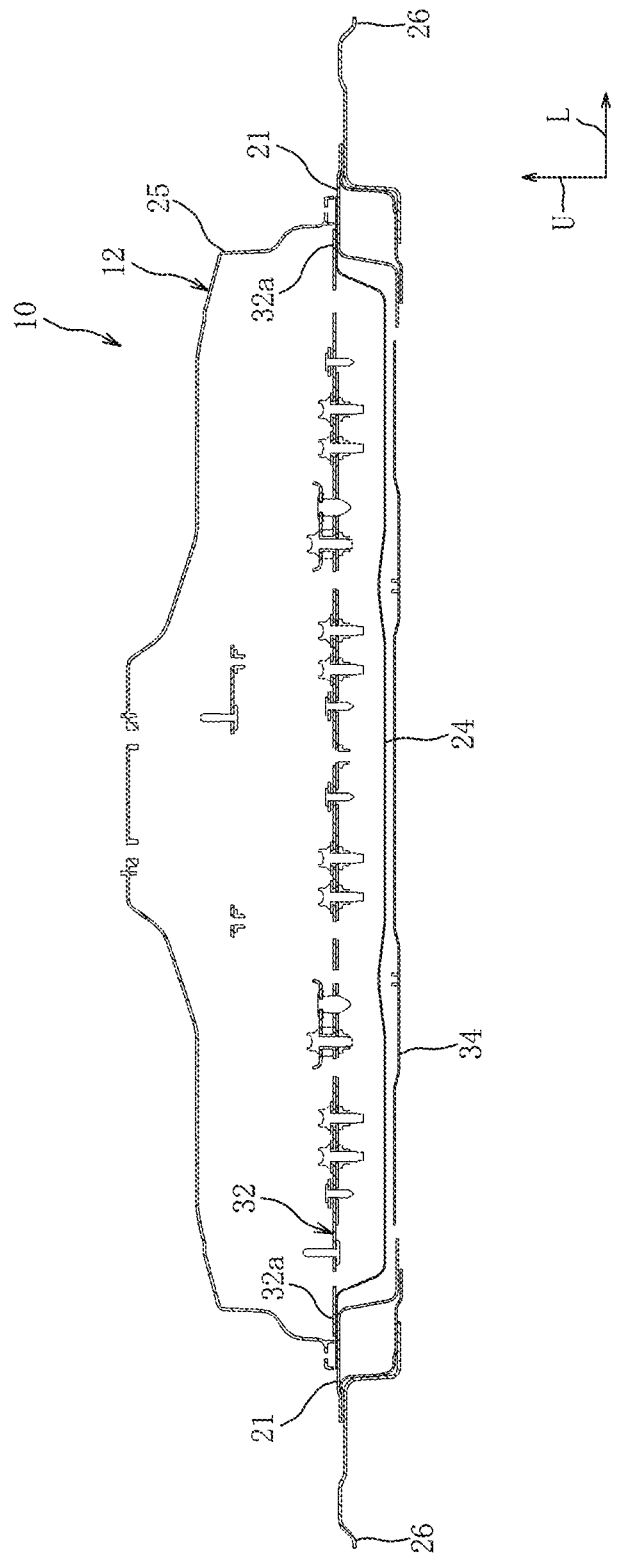
FIG. 7 is a sectional view taken along line VII-VII of FIG. 4.

Each of the frames 21-23 is configured to have a nearly rectangular-shaped closed-cross section which is formed by a lower panel having a nearly L-shaped cross section and an upper panel having a nearly L-shaped cross section (see FIG. 7). The closed-cross sections of the frames 21-23 are continuous in a ring shape such that the frames 21-23 form a ring-shaped closed-cross section structure. The frames 21-23 are attached to the vehicle body by attachment portions 26-29. Four pairs of right-and-left attachment portions 26 and a pair of right-and-left attachment portions 27 extend outwardly, in the vehicle width direction, from the respective lower panels of the pair of side frames 21, respectively. These attachment portions 26, 27 are fixedly fastened to lower wall portions of the floor frames 3 by molts b. A pair of right-and-left attachment portions 28 extend forwardly from the lower panel of the front frame 22, respectively. The attachment portions 28 are fixedly fastened to a lower surface of a front-side portion of the front panel 2a by bolts b. The attachment portion 29 extends upwardly from a central portion of the lower panel of the rear frame 23 and its upper end portion is fixedly fastened to a cross member (not illustrated) which forms a closed-cross section extending laterally cooperatively with the rear panel 2b by bolts b.

Figure 4:
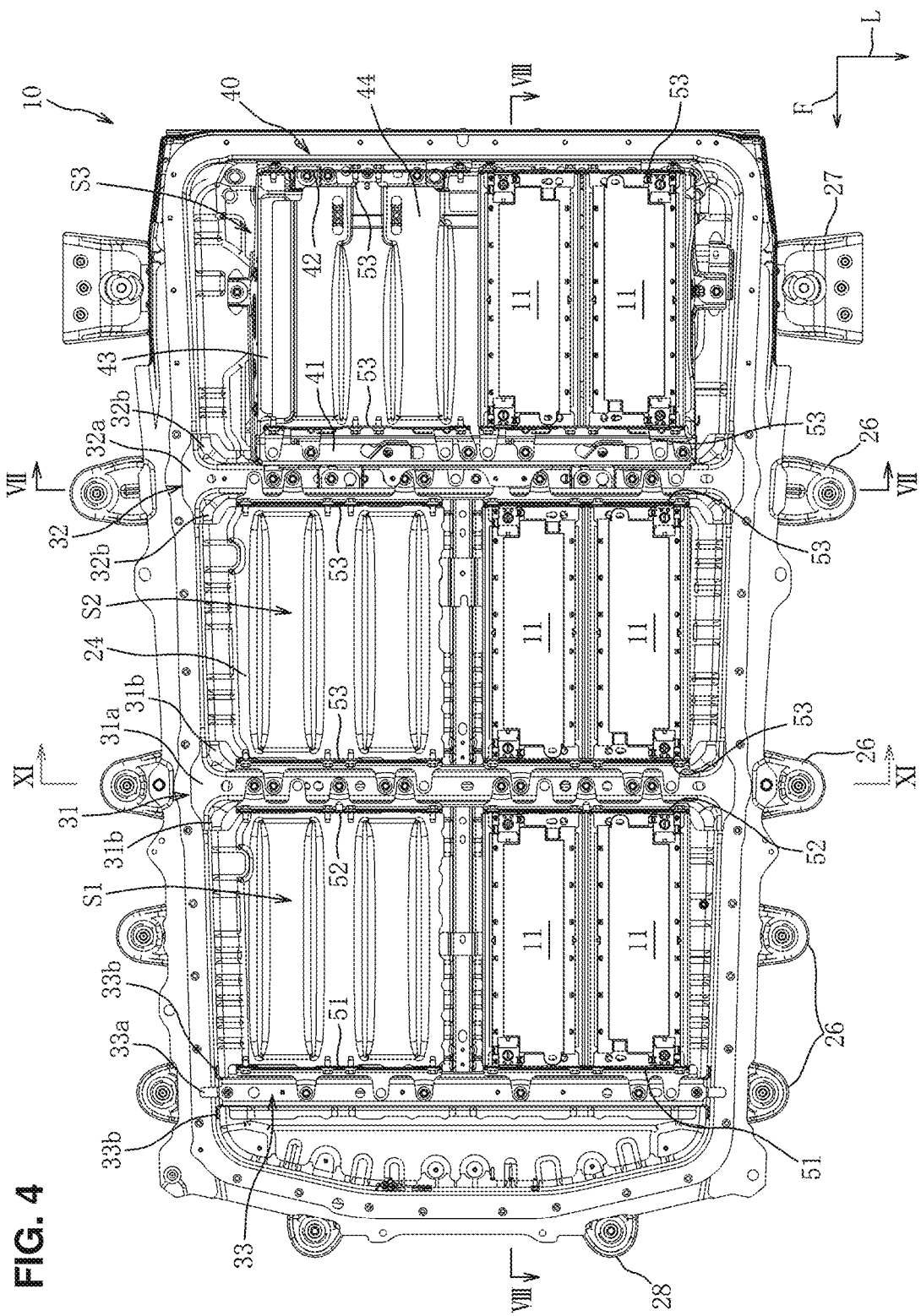
FIG. 4 is a plan view of the battery unit without a cover member and right-side battery modules.
Figure 5:
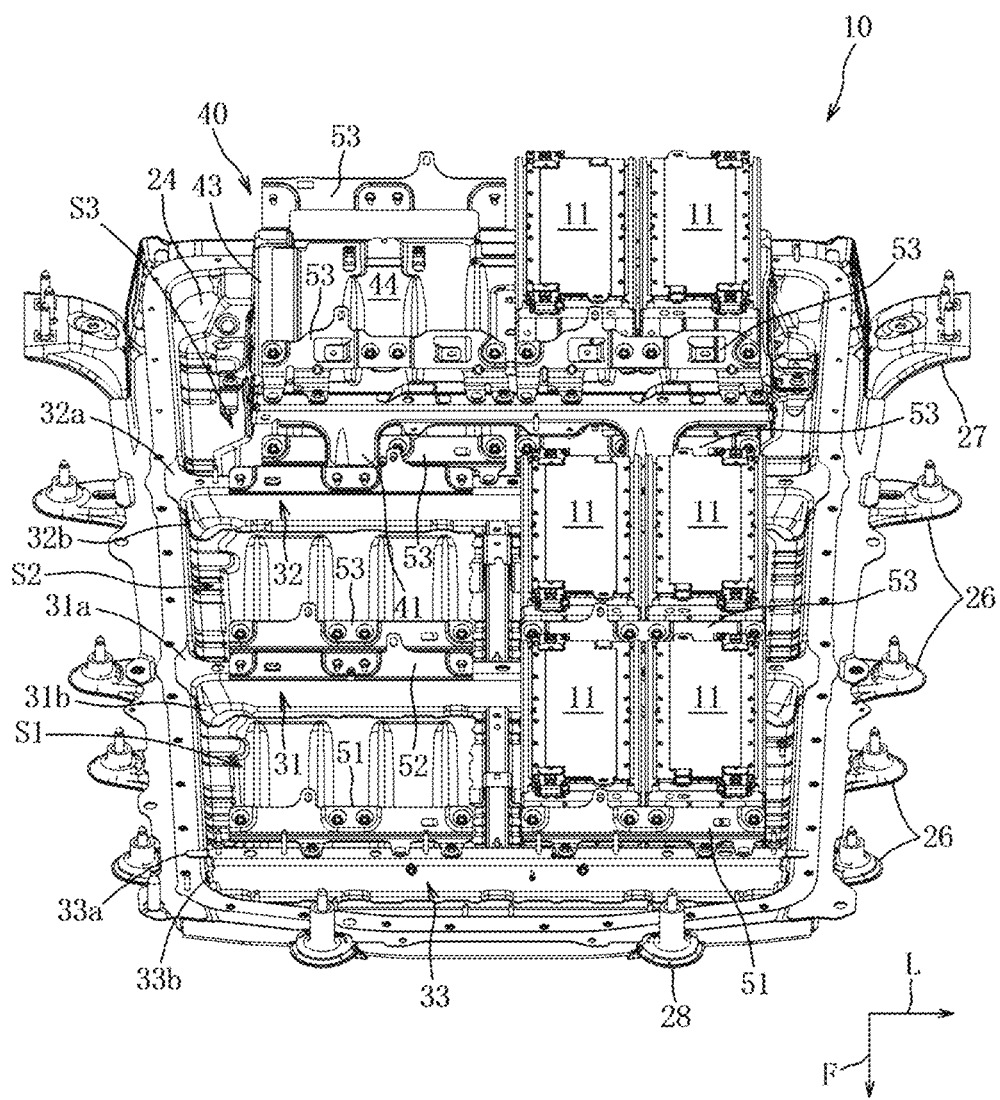
FIG. 5 is a perspective view of the battery unit without the cover member and the right-side battery modules, when viewed from an upper-front side.

As shown in FIGS. 3-5, the battery tray 24 is firmly welded in a state where it is placed on respective upper wall portions of the frames 21-23. A plate-shaped rubber member (not illustrated) is provided between the battery tray 24 and the battery modules 11. Thereby, a distance between the battery tray 24 and the battery modules 11 is configured to be changeable.

The battery tray 24 is configured to have first-third storage areas (battery storage areas) S1-S3 storing the battery modules 11 which is partitioned by first-third cross frames 31-33, respectively, having a nearly hat-shaped cross section. The third and first cross frames 33, 31 partition a longitudinal range of the first storage area S1 which corresponds to a lower side of a front part (a seat for front seat's passenger) of the front panel 2a, the first and second cross frames 31, 32 partition a longitudinal range of the second storage area S2 which corresponds to a lower side of a rear part of the front panel 2a, and the second cross frame 32 and the rear frame 23 partition a longitudinal range of the third storage area S3 which corresponds to a lower side of the kick-up panel 2c and the rear panel 2b. The first and second storage areas S1, S2 respectively store the four battery modules 11 such that these battery modules 11 are aligned laterally in a single-layer state.

Figure 6:
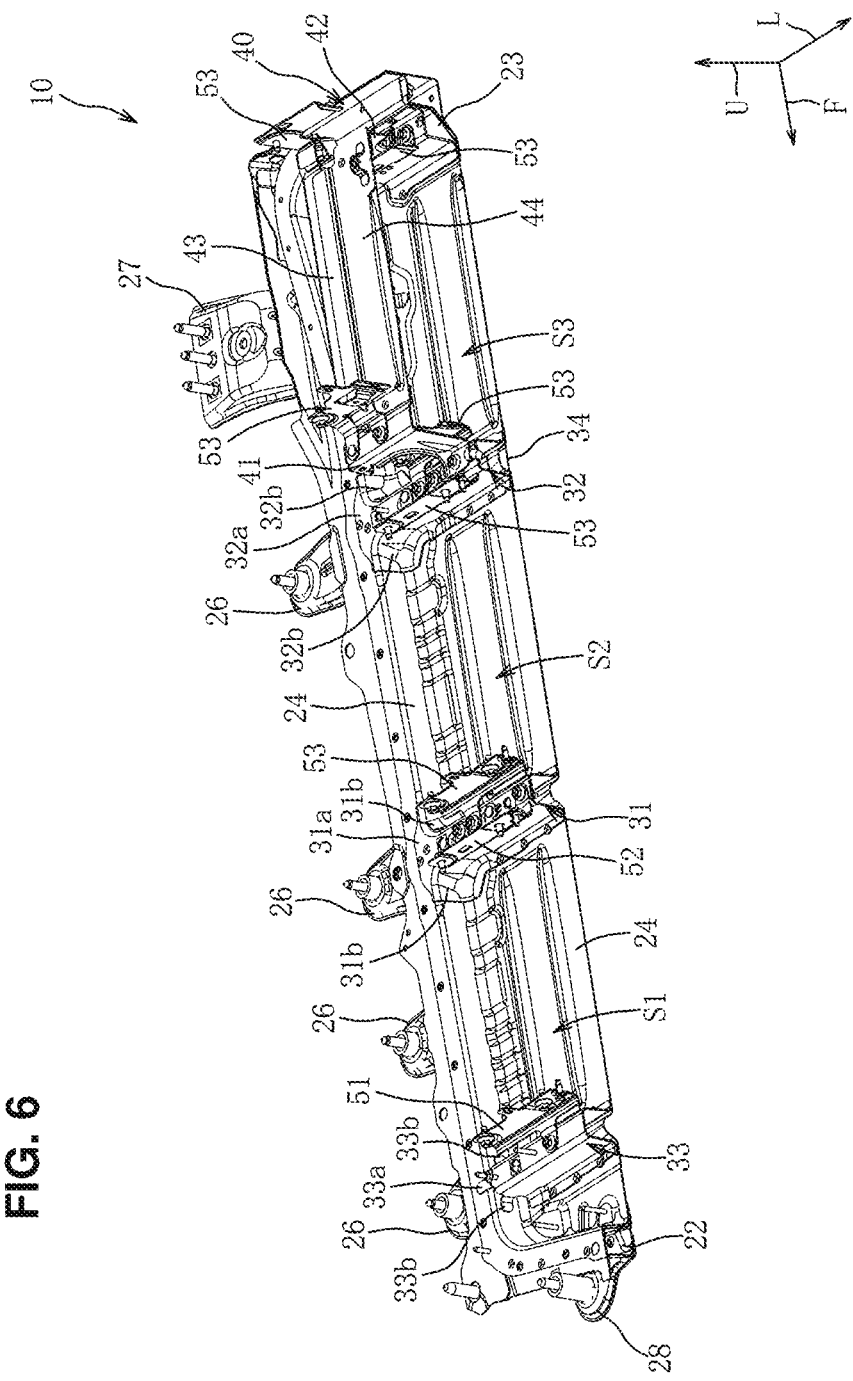
FIG. 6 is a perspective sectional view of a major part of FIG. 4.

The third storage area S3 has a two-stage supporting mechanism 40. That is, this third storage area S3 stores the eight battery modules 11 such that the lower-side four battery modules 11 are aligned laterally and the upper-side four battery modules 11 are aligned laterally above the lower-side four battery modules 11. As shown in FIGS. 4-6, the two-stage supporting mechanism 40 comprises a nearly i-shaped front support portion 41, a nearly π-shaped rear support portion 42, a pair of right-and-left nearly T-shaped side support portions 43 which interconnect respective right-and-left end portions of the front support portion 41 and the rear support portion 42, a bottom-plate member 44 which extends over the support portions 41-43, and others, which supports the upper-side four battery modules 11. A pair of right-and-left leg parts of the front support portion 41 are fixedly fastened to the upper wall portion of the second cross frame 32, and a pair of right-and-left leg parts of the rear support portion 42 are fixedly fastened to the upper wall portion of the rear frame 23. Leg parts of the pair of side support portions 43 are fixedly fastened to onto the battery tray 24.

Each of the first-third cross frames 31-33 forms a closed-cross section extending laterally above the battery tray 24 cooperatively with the battery tray 24. As shown in FIGS. 4-6, the first cross frame 31 comprises upper-wall connection portions 31a which respectively extend outwardly, in the vehicle width direction, from right-and-left both end portions of its upper wall portion and a pair of front-and-rear side-wall connection portions 31b which respectively extend forwardly and rearwardly from respective right-and-left both end portions of its front wall portion and its rear wall portion. The upper-wall connection portion 31a is connected to the upper wall portion of the side frame 21, and the pair of side-wall connection portions 31b are connected to an inside wall portion of the side frame 21, respectively. The upper-wall connection portion 31a and the pair of side-wall connection portion 31b are formed integrally. The third cross frame 33 comprises upper-wall connection portions 33a which respectively extend outwardly, in the vehicle width direction, from right-and-left both end portions of its upper wall portion and a pair of front-and-rear side-wall connection portions 33b which respectively extend forwardly and rearwardly from respective right-and-left both end portions of its front wall portion and its rear wall portion. The upper-wall connection portion 33a is connected to the upper wall portion of the side frame 21, and the pair of side-wall connection portions 33b are connected to an inside wall portion of the side frame 21, respectively. The upper-wall connection portion 33a and the pair of side-wall connection portion 33b are formed separately.

The second cross frame 32 comprises upper-wall connection portions 32a which respectively extend outwardly, in the vehicle width direction, from right-and-left both end portions of its upper wall portion and a pair of front-and-rear side-wall connection portions 32b which respectively extend forwardly and rearwardly from respective right-and-left both end portions of its front wall portion and its rear wall portion. The upper-wall connection portion 32a is connected to the upper wall portion of the side frame 21, and the pair of side-wall connection portions 32b are connected to an inside wall portion of the side frame 21, respectively. The upper-wall connection portion 32a and the pair of side-wall connection portion 32b are formed integrally. As shown in FIGS. 1, 6-8, a lower-side cross frame 34 extending laterally is provided at a lower surface of the battery tray 24. The lower-side cross frame 34 forms a closed-cross section extending laterally cooperatively with the battery tray 24 below the battery tray 24. The closed-cross section formed by the lower-side cross frame 34 is positioned vertically adjacently to the closed-cross section formed by the second cross frame 32, interposing the battery tray 24.

Figure 9A:
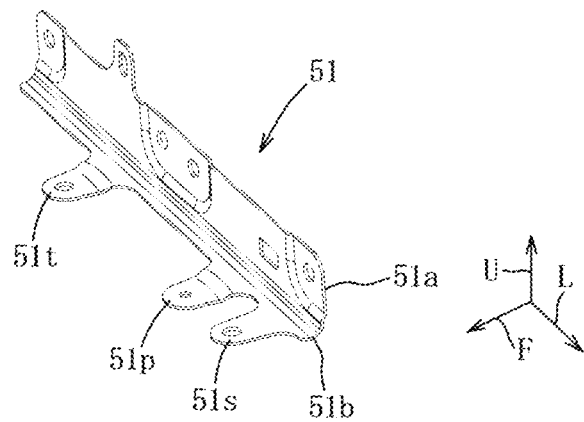
FIGS. 9A, 9B and 9C are perspective views of first-third mounting brackets.
Figure 9B:
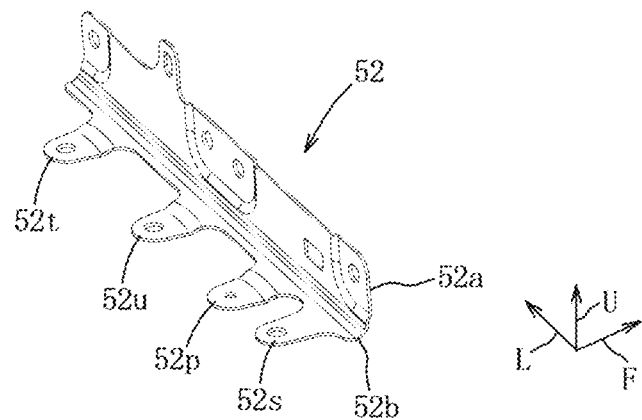
Figure 9C:
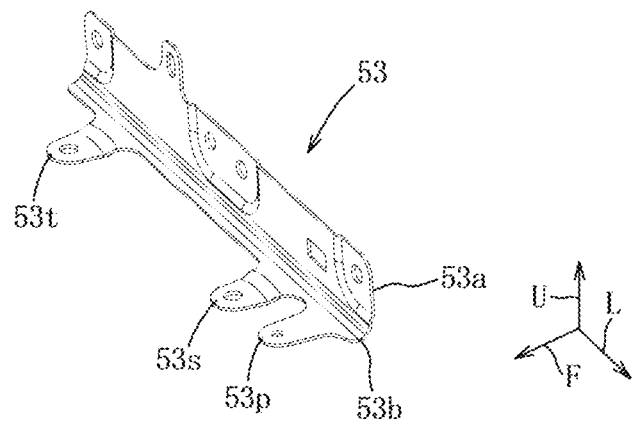

The battery modules 11 are mounted at the first-third cross frames 31-33 and the rear frame 23 by a pair of front-and-rear metal-plate made mounting brackets 51-53. As shown in FIGS. 9A-9C, the mounting brackets 51-53 comprise connecting wall portions 51a-53a which extend vertically and are connected to the battery modules 11 and fixing wall portions 51b-53b which extend longitudinally and are connected by fastening members, and are configured to have a nearly L-shaped cross section. The connecting wall portions 51a, 53a of the mounting brackets which are mounted at a front side of the battery modules 11 are connected to front wall portions of the two laterally-adjacent battery modules 11 by four bolts, and the connecting wall portions 52a, 53a of the mounting brackets which are mounted at a rear side of the battery modules 11 are connected to rear wall portions of the two laterally-adjacent battery modules 11 by four bolts. Further, as shown in FIG. 8, the connecting wall portions 51a-53a of the mounting brackets 51-53 are connected to the battery modules 11 such that a center of gravity (the rotational axial line G) of each of the battery modules 11 is located substantially at the same level as each of the upper wall portions of the first-third cross frames 31-33 and the rear frame 23.

The right-and-left first mounting brackets 51 fixed to the third cross frame 33 and the right-and-left second mounting brackets 52 fixed to the first cross frame 31 are provided in the first storage area S1. As shown in FIG. 9A, the first mounting bracket 51 is made by pressing 1.6 mm steel plate, for example, and comprises the connecting wall portion 51a and the fixing wall portion 51b. The fixing wall portion 51b is provided with a fastening portion 51s which extends forwardly (in an opposite direction to a bending part) at its left-side end portion. Further, a poisoning portion 51p extending forwardly is formed at a portion of the fixing wall portion 51b which is located between a central part of the fixing wall portion 51b and a left-side end part of the fixing wall portion 51b and also slightly closer to the central part of the fixing wall portion 51b, and a fastening portion 51t extending forwardly is formed at another portion of the fixing wall portion 51b which is located at a symmetrical position to the positioning portion 51p relative to the central part of the fixing wall portion 51b. The fixing wall portion 51b extends forwardly from the fixing wall portion 51b, and the fastening portion 51s and the fastening portion 51t are fixed to the upper wall portion of the third cross frame 33 by bolts. Herein, regarding the left-side first mounting bracket 51, its positioning is performed at the outward-side fastening portion 51s and its fastening (fixation) is performed at the inward-side poisoning portion 51p (see FIG. 4).

As shown in FIG. 9B, the second mounting bracket 52 is made by pressing 1.6 mm steel plate, for example, and comprises the connecting wall portion 52a and the fixing wall portion 52b. The fixing wall portion 52b is provided with a fastening portion 52s which extends rearwardly at its right-side end portion. Further, a fastening portion 52t extending rearwardly is formed at its left-side end portion, a fastening portion 52u extending rearwardly is formed at a central part of the fixing wall portion 52b, and a positioning portion 52p extending rearwardly is formed at a central position between the fastening portion 52s and the fastening portion 52u. A distance between the left end portion and the fastening portion 51s is set to be substantially equal to that between the right end portion and the fastening portion 52s and also to that distance between the left end portion and the fastening portion 52t. Further, a distance between the left end portion and the fastening portion 51p is set to be larger than that between the right end portion and the fastening portion 52p. The fixing wall portion 52b extends rearwardly from a bending part, and the fastening portion 52s, the fastening portion 52t, and the fastening portion 52u are fixed to the upper wall portion of the first cross frame 31 by bolts.

The right-and-left third mounting brackets 53 fixed to the first cross frame 31 and the right-and-left third mounting brackets 53 fixed to the second cross frame 32 are provided in the second storage area S2. As shown in FIG. 9C, the third mounting bracket 53 fixed to the first cross frame 31 is made by pressing 2.0 mm steel plate, for example, and comprises the connecting wall portion 53a and the fixing wall portion 53b. The fixing wall portion 53b is provided with a positioning portion 53p which extends forwardly at its left-side end portion. Further, a fastening portion 53s extending forwardly is formed at a portion of the fixing wall portion 53b which is located between a central part of the fixing wall portion 53b and a left-side end part of the fixing wall portion 53b, and a fastening portion 53t extending forwardly is formed at a right-side end part of the fixing wall portion 53b. The fixing wall portion 53b extends forwardly from a bending part. A distance between the left end portion and the fastening portion 52s is substantially equal to that between the right end portion and the positioning portion 53p, and a distance between the right end portion and the fastening portion 52p is substantially equal to that between the left end portion and the fastening portion 53s. The left-side third mounting bracket 53 fixed to the first cross frame 31 and the pair of right-and-left third mounting brackets 53 fixed to the second cross frame 32 are configured similarly except an arrangement position thereof.

The pair of right-and-left third mounting brackets 53 fixed to the second cross frame 32 and the pair of right-and-left third mounting brackets 53 fixed to the rear frame 23 are arranged at a lower stage of the third storage area S3 similarly to the second storage area S2. Further, at an upper stage of the third storage area S3 are arranged the pair of right-and-left third mounting brackets 53 fixed to the front support portion 41 and the pair of right-and-left third mounting brackets 53 fixed to the rear support portion 42 similarly to the lower stage of the third storage area S3. The first-third mounting brackets 51-53 are designed substantially similarly except the plate thickness, the position of the fastening portion, and the position of the positioning portion.

The twelve battery modules 11 stored in the second and third storage areas S2, S3 are mounted at the cross frames 31, 32 and the rear frame 23 by six pairs of front-and-rear third mounting brackets 53, so that each of the battery modules 11 has the same mounting rigidity. Meanwhile, the four battery modules 11 stored in the first storage area S1 are mounted at the cross frames 33, 31 by the two pairs of front-and-rear first and second mounting brackets 51, 52. Since the first and second mounting brackets 51, 52 have the different plate thickness and the position of the fastening portions (fixing manner) from the third mounting bracket 53, the natural frequency of the battery modules 11 stored in the first storage area S1 is different from that of the battery modules 11 stored in the second and third storage areas S2, S3. Accordingly, even in a case where all of the battery modules 11 are respectively stored in the battery case 12 in the same position in three directions of the vehicle width direction, the vehicle longitudinal direction, and the height direction, resonance of vibration of the battery unit 10 and vibration of the vehicle body at a middle-frequency band is suppressed.

Hereafter, the function/effects of the above-described battery unit mounting structure will be described. The simulation analysis by the CAE (Computer Aided Engineering) was conducted. A vehicle model A (evaluation standard model) where all of the battery modules 11 stored in the first-third storage areas S1-S3 are mounted by the third mounting brackets 53 and a vehicle model B according to the present embodiment were prepared, and the analysis of the noise level in the cabin at the frequency band of 125 Hz was conducted. Herein, the vehicle model B was configured, for simplifying the evaluation, such that the battery modules 11 stored in the first storage area S1 were mounted by using the second mounting brackets 52, and the battery modules 11 stored in the second and third storage areas S2, S3 were mounted by using the third mounting brackets 53. The vehicle model A and the vehicle model B had the same structure except the mounting brackets.

Figure 10:
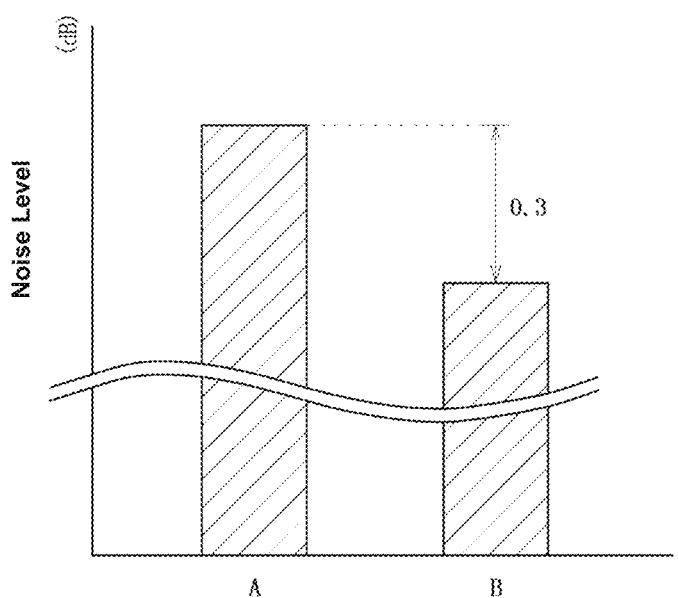
FIG. 10 shows analysis results regarding respective each noise level of a model of the present embodiment and an evaluation standard model.
Figure 11:
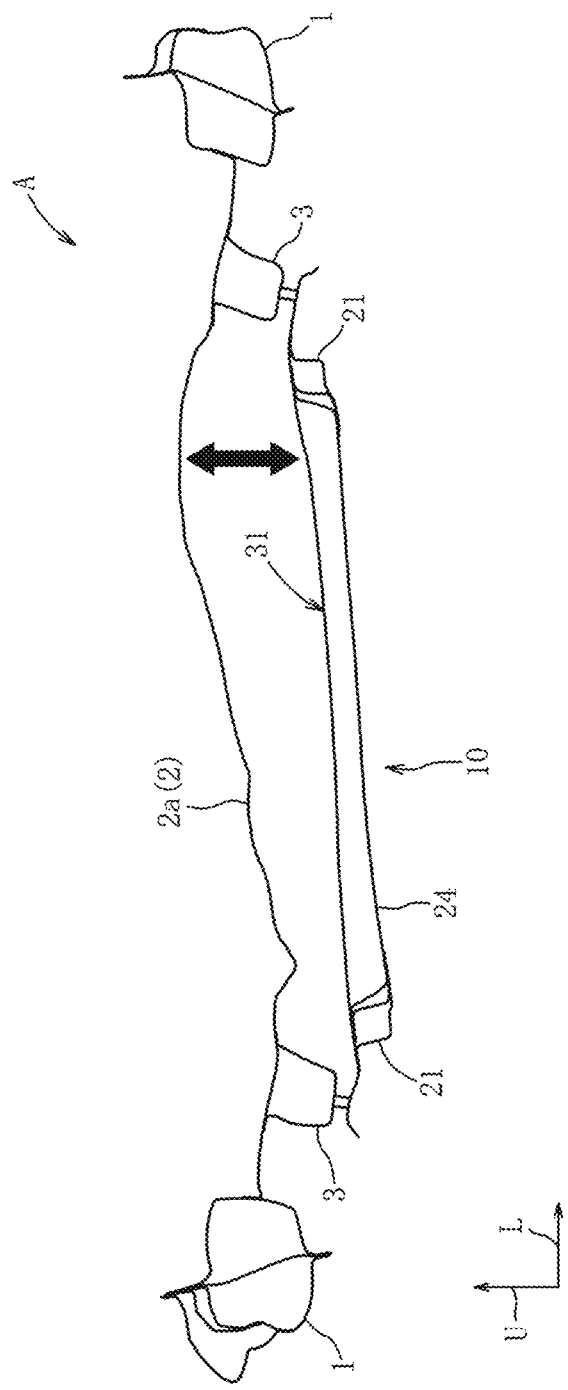
FIG. 11 is an explanatory diagram regarding a vibration motion of the evaluation standard model corresponding to a sectional view along line XI-XI of FIG. 4.

FIG. 10 shows analysis results. As shown in FIG. 10, the road noise was generated at the frequency band of 125 Hz in the vehicle model A. Since the battery modules 11 were stored in the first-third storage areas S1-S3 in the vehicle model A, the total weight of the battery unit (the battery modules 11) acted on the vehicle body, so that the road noise was effectively suppressed. However, since the battery modules 11 had the same mounting rigidity, the battery modules 11 stored in the first storage area S1 and the battery modules 11 stored in the second storage area S2 performed the same frequency motion, so that a lateral swing having a time difference at a front side and a rear side of the vehicle body was amplified. Therefore, as shown by an arrow in FIG. 11, the lateral swing having the time difference at the front side and the rear side of the vehicle body induced a vertical displacement of the front panel 2a of the vehicle model A, so that the road-noise performance was deteriorated. In FIG. 11, illustration of the battery modules 11 is omitted for convenience sake.

Meanwhile, since the battery modules 11 stored in the first storage area S1 had the different mounting rigidity (the number of fastening portions) from the battery modules 11 stored in the second storage area S1, the natural frequencies of the both battery modules 11 were different from each other. Therefore, resonance of the battery modules 11 stored in the first storage area S1 and the battery modules 11 stored in the second storage area S2 was so avoided that the lateral swing of the vehicle body at the frequency band corresponding to the road noise was suppressed. Consequently, the vertical displacement of the front panel 2a was suppressed and thereby the vehicle-body vibration at the middle frequency band was reduced. As shown in FIG. 10, it was found that the noise level of the vehicle model B at the frequency band corresponding to the road noise was 0.3 dB lower than that of the vehicle model A. Herein, the natural frequency of the battery modules 11 mounted by using the third mounting brackets 53 was about 125 Hz, and the natural frequency of the battery modules 11 mounted by using the second mounting brackets 52 was about 160 Hz.

According to the battery unit mounting structure of the electric vehicle of the present embodiment, the battery unit 10 comprises the pair of right-and-left side frames 21 attached to the pair of floor frames 3, the cross frames 31-33 extending in the vehicle width direction and interconnecting the pair of side frames 21, and the plural battery modules 11 having substantially the same size comprising the longitudinal dimension, the lateral dimension, and the height dimension perpendicular to the longitudinal dimension and the lateral dimension, and the plural battery modules 11 are respectively mounted at the cross frames 31-33 in the same position and arranged in the plural rows adjacently to the vehicle width direction such that the direction of the longitudinal dimension is substantially parallel to the vehicle longitudinal direction. Therefore, the battery unit 10 can be compact properly. Further, since the mounting rigidity of the battery modules 11 stored in the first storage area S1 is set to be different from that of the battery modules 11 stored in the second and third storage areas S2, S3, the natural frequency of the battery modules 11 stored in the first storage area S1 and the natural frequency of the battery modules 11 stored in the second and third storage areas S2, S3 can be differentiated by changing the mounting rigidity of these battery modules 11, so that an element of the middle-frequency band of the battery unit 10 is so reduced that the resonance of the battery unit 10 and the vehicle-body vibration can be suppressed properly.

Since the plural battery modules 11 are arranged in three or more rows extending in the vehicle width direction, and the mounting rigidity of the battery modules 11 stored in the front-end-side first storage area S1 is set to be different from that of the battery modules 11 stored in the second and third storage areas S2, S3, the resonance-suppression performance can be improved by changing the mounting rigidity of the battery modules 11 positioned at the one-end-side row(i.e., stored in the first storage area S1) which may greatly affect the vehicle-body vibration.

The plural battery modules 11 are arranged in the longitudinal direction in three or more rows, the battery modules 11 stored in the foremost-row first storage area S1 are arranged in the single-layer state and the battery modules 11 stored in the rearmost-row third storage area S3 are arranged below the kick-up portion 2c of the floor panel 2 in the two-layer state of upper-and-lower two stages, and the mounting rigidity of the battery modules 11 stored in the first storage area S1 is set to be different from that of the battery modules 11 stored in the second and third storage areas S2, S3. Accordingly, the road-noise performance of the battery unit 10 where the battery modules 11 are mounted in the upper-and-lower two stages can be improved by minimum mounting-rigidity changing.

The plural battery modules 11 are arranged in the longitudinal direction in three or more rows, the battery modules 11 stored in the foremost-row first storage area S1 and the second storage area S2 positioned behind the foremost-row first storage area S1 are arranged in the single-layer state and the battery modules 11 stored in the third storage area S3 positioned behind the second storage area S2 are arranged in the two-layer state of the upper-and-lower two stages, and the mounting rigidity of the battery modules 11 stored in the first storage area S1 is set to be different from that of the battery modules 11 stored in the second storage area S2. Accordingly, the road-noise performance of the battery unit 10 where the battery modules 11 are mounted in the upper-and-lower two stages can be improved by minimum mounting-rigidity changing.

Since the plural battery modules 11 are mounted at the cross frames 31-33 by the mounting brackets 51-53, the mounting rigidity of the battery modules 11 can be changed by changing of the mounting brackets 51-53 regardless of characteristics of the side frames 21 and the cross frames 31-33.

Since the mounting rigidity of the battery modules 11 stored in the first storage area S1 is set to be higher than the mounting rigidity of the battery modules 11 stored in the second and third storage areas S2, S3, the natural frequency of the battery modules 11 stored in the first storage area S1 and the natural frequency of the battery modules 11 stored in the second and third storage areas S2, S3 can be differentiated, securing the mounting rigidity of the battery modules 11 stored in the first storage area S1.

Since the number of the fastening portions 52s-52u of the second mounting brackets 52 to mount the battery modules 11 stored in the first storage area S1 is set to be larger than the number of the fastening portions 53s, 53t of the third mounting brackets 53 to mount the battery modules 11 stored in the second and third storage areas S2, S3, the natural frequency of the battery modules 11 stored in the first storage area S1 can be higher than the natural frequency of the battery modules 11 stored in the second and third storage areas S2, S3 by minimum changing.

Next, some modifications where the above-described embodiment is partially modified will be described.

1] While the above-described embodiment described a case where the plural battery modules 11 were supported at the cross frames 31-33 and the rear frame 23 such that the longitudinal direction of the battery modules 11 was parallel to the vehicle longitudinal direction, they may be supported at the side frames 21 such that the longitudinal direction of the battery modules 11 is parallel to the vehicle width direction. In this case, the mounting brackets 51-53 to mount the battery modules 11 are fixed to the side frames 21. Further, while a case where the front wall portion and the rear wall portion, in the longitudinal direction, of the battery module 11 were interposed between the mounding brackets 51-53 was described, the side wall portion of the battery module 11 may be interposed between the mounting brackets 51-53.

2] While the above-described embodiment described a case where the first-third storage areas S1-S3 were provided, two storage areas or four or more storage areas may be provided. Further, while a case where the two-stage supporting mechanism 40 was provided at the rear-end-side third storage area S3 was described, three or more-stage supporting mechanism may be provided, and the two-stage supporting mechanism or the three or more-stage supporting mechanism may be provided at the second storage area S2 as well.

3] While the above-described embodiment described a case where the first mounting bracket 51 was provided at the front side of the first storage area S1 and the second mounting bracket 52 was provided at the rear side of the first storage area S1, the first mounting bracket 51 or the second mounting bracket 52 may be provided at the front side and the rear side of the first storage area S1. Further, a case where the mounting rigidity of the battery modules 11 stored in the first storage area S1 was set to be higher than that of the battery modules 11 stored in the second and third storage areas S2, S3 was described, the mounting rigidity of the battery modules 11 stored in the first storage area S1 may be set to be lower than that of the battery modules 11 stored in the second and third storage areas S2, S3. In this case, the number of fastening portions is decreased or the plate thickness is decreased.

4] While the above-described embodiment described a case where the battery modules 11 were arranged in the plural rows adjacently to the vehicle width direction such that each of their longitudinal directions was parallel to the vehicle longitudinal direction, the battery modules 11 may be arranged in the plural rows adjacently to the vehicle longitudinal direction such that each of their longitudinal directions is parallel to the vehicle width direction. In this case, the battery modules 11 may be supported at the cross frames 31-33 and the rear frame 23, or supported at the side frames 21.

5] While the above-described embodiment described a case where the battery module 11 was of a rectangular parallelepiped shape, any shape is applicable as long as it is formed in the rectangular shape in the plan view. Even if the battery unit comprises plural columnar battery modules which are arranged such that each of their shaft (axial) centers corresponds to (matches) the vehicle longitudinal direction or the vehicle width direction, the similar effects may be provided.

6] The present invention should not be limited to the above-described embodiment or modifications and any other improvements may be applied within the scope of a spirit of the present invention.

What is claimed is:

1. A battery unit mounting structure of an electric vehicle, comprising:
   a floor panel;
   a pair of right-and-left floor frames provided below the floor panel, each of which forms a closed-cross section extending longitudinally cooperatively with the floor panel; and
   a battery unit supporting plural battery modules and mounted at the pair of floor frames,
   wherein said battery unit comprises a pair of right-and-left side frames attached to said pair of floor frames, a cross frame extending in a vehicle width direction and interconnecting said pair of side frames, and the plural battery modules,
   said plural battery modules are respectively formed in a rectangular shape in a plan view and have substantially the same size comprising a longitudinal dimension which corresponds to a longitudinal direction of said rectangular shape, a lateral dimension which corresponds to a direction perpendicular to said longitudinal direction of the rectangular shape, and a height dimension which corresponds to a vehicle vertical direction perpendicular to said longitudinal direction and said direction perpendicular to the longitudinal direction of the rectangular shape,
   said plural battery modules are respectively mounted at said side frames and/or said cross frame in the same position and arranged in plural rows adjacently to the vehicle width direction and/or a vehicle longitudinal direction such that the direction of said longitudinal dimension of the rectangular shape is substantially parallel to the vehicle longitudinal direction or the vehicle width direction, and
   mounting rigidity of the battery modules positioned at a part of said plural rows is set to be different from that of the battery modules positioned at another part of said plural rows.

2. The battery unit mounting structure of the electric vehicle of claim 1, wherein said plural battery modules are arranged in three or more rows extending in the vehicle width direction, and the mounting rigidity of the battery modules positioned at any one-end-side row of said three or more rows is set to be different from that of the battery modules positioned at the other row of said three or more rows.

3. The battery unit mounting structure of the electric vehicle of claim 2, wherein said plural battery modules are arranged in the longitudinal direction in three or more rows, the battery modules positioned at a foremost row of said three or more rows are arranged in a single-layer state and the battery modules positioned at a rearmost row of said three or more rows are arranged below a kick-up portion of said floor panel in a two-layer state of upper-and-lower two stages, and the mounting rigidity of said battery modules positioned at the foremost row is set to be different from that of the battery modules positioned at the other row.

4. The battery unit mounting structure of the electric vehicle of claim 3, wherein said plural battery modules are mounted at said side frames and/or said cross frame by mounting brackets.

5. The battery unit mounting structure of the electric vehicle of claim 4, wherein said mounting rigidity of the battery modules positioned at the part of the plural rows is set to be higher than said mounting rigidity of the battery modules positioned at the other part of the plural rows.

6. The battery unit mounting structure of the electric vehicle of claim 4, wherein the number of mounting points of said mounting brackets to mount the battery modules positioned at the part of the plural rows is set to be larger than the number of mounting points of said mounting brackets to mount the battery modules positioned at the other part of the plural rows.

7. The battery unit mounting structure of the electric vehicle of claim 3, wherein said mounting rigidity of the battery modules positioned at the part of the plural rows is set to be higher than said mounting rigidity of the battery modules positioned at the other part of the plural rows.

8. The battery unit mounting structure of the electric vehicle of claim 2, wherein said plural battery modules are arranged in the longitudinal direction in three or more rows, the battery modules positioned at a foremost row and a second row behind the foremost row of said three or more rows are arranged in a single-layer state and the battery modules positioned at another row behind said second row are arranged in the two-layer state of the upper-and-lower two stages, and the mounting rigidity of said battery modules positioned at the foremost row is set to be different from that of said battery modules positioned at the second row.

9. The battery unit mounting structure of the electric vehicle of claim 8, wherein said plural battery modules are mounted at said side frames and/or said cross frame by mounting brackets.

10. The battery unit mounting structure of the electric vehicle of claim 9, wherein said mounting rigidity of the battery modules positioned at the part of the plural rows is set to be higher than said mounting rigidity of the battery modules positioned at the other part of the plural rows.

11. The battery unit mounting structure of the electric vehicle of claim 9, wherein the number of mounting points of said mounting brackets to mount the battery modules positioned at the part of the plural rows is set to be larger than the number of mounting points of said mounting brackets to mount the battery modules positioned at the other part of the plural rows.

12. The battery unit mounting structure of the electric vehicle of claim 8, wherein said mounting rigidity of the battery modules positioned at the part of the plural rows is set to be higher than said mounting rigidity of the battery modules positioned at the other part of the plural rows.

13. The battery unit mounting structure of the electric vehicle of claim 2, wherein said plural battery modules are mounted at said side frames and/or said cross frame by mounting brackets.

14. The battery unit mounting structure of the electric vehicle of claim 13, wherein said mounting rigidity of the battery modules positioned at the part of the plural rows is set to be higher than said mounting rigidity of the battery modules positioned at the other part of the plural rows.

15. The battery unit mounting structure of the electric vehicle of claim 13, wherein the number of mounting points of said mounting brackets to mount the battery modules positioned at the part of the plural rows is set to be larger than the number of mounting points of said mounting brackets to mount the battery modules positioned at the other part of the plural rows.

16. The battery unit mounting structure of the electric vehicle of claim 2, wherein said mounting rigidity of the battery modules positioned at the part of the plural rows is set to be higher than said mounting rigidity of the battery modules positioned at the other part of the plural rows.

17. The battery unit mounting structure of the electric vehicle of claim 1, wherein said plural battery modules are mounted at said side frames and/or said cross frame by mounting brackets.

18. The battery unit mounting structure of the electric vehicle of claim 17, wherein said mounting rigidity of the battery modules positioned at the part of the plural rows is set to be higher than said mounting rigidity of the battery modules positioned at the other part of the plural rows.

19. The battery unit mounting structure of the electric vehicle of claim 17, wherein the number of mounting points of said mounting brackets to mount the battery modules positioned at the part of the plural rows is set to be larger than the number of mounting points of said mounting brackets to mount the battery modules positioned at the other part of the plural rows.

20. The battery unit mounting structure of the electric vehicle of claim 1, wherein said mounting rigidity of the battery modules positioned at the part of the plural rows is set to be higher than said mounting rigidity of the battery modules positioned at the other part of the plural rows.

* * * * *